US012630167B2

(12) United States Patent (10) Patent No.: US 12,630,167 B2

Bomert et al. (45) Date of Patent: May 19, 2026

(54) METHOD AND SYSTEM FOR DETERMINING COMPATIBILITY OF SYSTEM PARAMETERS

(71) Applicant: dSPACE GmbH, Paderborn (DE)

(72) Inventors: Andreas Bomert, Paderborn (DE); Daniel Becke, Paderborn (DE); Matthias Werth, Paderborn (DE)

(73) Assignee: dSPACE GmbH, Paderborn (DE)

( * ) Notice: Subject to any disclaimer, the term of this patent is extended or adjusted under 35 U.S.C. 154(b) by 295 days.

(21) Appl. No.: 18/082,249

(22) Filed: Dec. 15, 2022

(65) Prior Publication Data

US 2023/0202492 A1 Jun. 29, 2023

(30) Foreign Application Priority Data

Dec. 27, 2021 (DE) .................... 10 2021 006 367.8

(51) Int. Cl.
|  |  |
|---|---|
| *B60W 50/02* | (2012.01) |
| *G06F 11/3698* | (2025.01) |
| *B60W 60/00* | (2020.01) |

(52) U.S. Cl.
CPC ..... *B60W 50/0205* (2013.01); *G06F 11/3698* (2025.01); *B60W 60/001* (2020.02); *B60W 2420/403* (2013.01); *B60W 2420/408* (2024.01); *B60W 2420/54* (2013.01); *B60W 2555/20* (2020.02)

(58) Field of Classification Search
CPC ...... G06F 11/3664; G06F 30/15; G06F 30/20; G06F 11/26; G06F 11/3457; G06F 11/3698; B60W 50/0205
See application file for complete search history.

(56) References Cited

U.S. PATENT DOCUMENTS

| | | | |
|---|---|---|---|
| 6,829,731 B1 | 12/2004 | LaFauci et al. | |
| 11,093,448 B2 | 8/2021 | Dain et al. | |
| 2012/0272228 A1* | 10/2012 | Marndi | G06F 8/65 |
| | | | 717/170 |
| 2016/0292306 A1* | 10/2016 | Migneault | G06F 30/00 |
| 2017/0132118 A1* | 5/2017 | Stefan | B60W 50/04 |
| 2017/0371986 A1 | 12/2017 | Yang et al. | |
| 2018/0089911 A1* | 3/2018 | Rath | G07C 5/0808 |
| 2019/0139332 A1* | 5/2019 | Antonsson | G06F 8/77 |

(Continued)

FOREIGN PATENT DOCUMENTS

DE 102006059829 A1 6/2008

*Primary Examiner* — Seth A Silverman
(74) *Attorney, Agent, or Firm* — Muncy, Geissler, Olds & Lowe, P.C.

(57) ABSTRACT

A computer-implemented method and system for determining compatibility of system parameters for a test execution of a virtual test of a device for at least partial autonomous guidance of a motor vehicle, comprising an application of a rule-based algorithm to the at least one first system parameter for determining compatibility of the at least one first system parameter with at least one further system parameter from a group comprising the system to be tested, the test environment, the test system, the test scenario and/or the vehicle type to be tested, wherein the rule-based algorithm determines compatibility on the basis of a hardware and/or software component that executes the virtual test of the device for at least partial autonomous guidance of the motor vehicle and/or provides test data.

19 Claims, 2 Drawing Sheets

(56) References Cited

U.S. PATENT DOCUMENTS

2020/0250363 A1* 8/2020 Partridge ................ G06F 30/27
2022/0198107 A1* 6/2022 Pedersen ............. G06F 11/3696
2022/0343038 A1* 10/2022 Zhu ........................ G06F 30/20

* cited by examiner

S1, 10a, 10b, 10c, 10d, 10e, 12

S2, A, 12, 14, 16, 28, 30

S3, 14

24, 26

10b, 20          18a, 22

10a

10b

10c

10d 10c, 20     10b, 20     18b, 22     18c, 22     18d, 22

10e, 20

METHOD AND SYSTEM FOR DETERMINING COMPATIBILITY OF SYSTEM PARAMETERS

This nonprovisional application claims priority under 35 U.S.C. § 119(a) to German Patent Application No. 10 2021 006 367.8, which was filed in Germany on Dec. 27, 2021, and which is herein incorporated by reference.

BACKGROUND OF THE INVENTION

Field of the Invention

The present invention relates to a computer-implemented method for determining compatibility of system parameters for a test execution of a virtual test of a device for at least partial autonomous guidance of a motor vehicle. The present invention also relates to a system for determining compatibility of system parameters for a test execution of a virtual test of a device for at least partial autonomous guidance of a motor vehicle.

Description of the Background Art

Driver assistance systems such as adaptive cruise control and/or functions for highly automated driving can be verified or validated using various verification methods. In particular, simulations can be used.

In order to create test scenarios for simulations, it is necessary to carry out test drives. The sensor data obtained in this way is then abstracted into a logical scenario. Input data are raw data, i.e., sensor data from real measurement runs in terms of recordings of radar echoes, 3D point clouds from LiDAR measurements and image data or virtually generated sensor data from radar, LiDAR, ultrasonic and/or camera sensors.

To execute a test, different elements are required in addition to the test itself. This includes at least one system to be tested, a test environment and a test system.

The system to be tested describes an element to be tested, e.g., ECU (Electronic Control Unit) software. The test environment describes the environment in which the system to be tested is tested and the test system describes the system on which the test is performed. Examples of the test system are HIL or SIL systems, which can be executed, e.g., on an execution node in the cloud.

Since there are usually different or several systems, test environments and test systems to be tested, the situation may arise that not every combination is desired or even possible.

In the event of a test misconfiguration, in which, for example, an incompatible combination of a system to be tested, test environment and test system is used, the incorrect test execution can lead to a test termination. This unnecessarily ties up computing time and/or computing resources and causes avoidable costs.

Consequently, there is a need to improve existing procedures for configuring a test execution of a virtual test of a device for at least partial autonomous driving of a motor vehicle in order to avoid erroneous test executions due to misconfigurations.

SUMMARY OF THE INVENTION

It is therefore an object of the invention to provide a method for configuring a test execution of a virtual test of a device for at least partial autonomous guidance of a motor vehicle, which allows for error-free configurability of the test execution.

The object is achieved according to an exemplary embodiment of the invention by a computer-implemented method for determining the compatibility of system parameters for a test execution of a virtual test of a device for at least partial autonomous guidance of a motor vehicle.

Furthermore, the object according to the invention is achieved by a system for determining compatibility of system parameters for a test execution of a virtual test of a device for at least partial autonomous guidance of a motor vehicle.

Thus, in an exemplary embodiment, the invention relates to a computer-implemented method for determining compatibility of system parameters for a test execution of a virtual test of a device for at least partial autonomous guidance of a motor vehicle.

The method comprises providing a parked selection or selecting at least one first system parameter that designates a system to be tested, a test environment, a test system, a test scenario and/or a vehicle type to be tested for the test execution of the virtual test.

The method further includes applying a rule-based algorithm to the at least one first system parameter for determining compatibility of the at least one first system parameter with at least one further system parameter from a group including the system to be tested, the test environment, the test system, the test scenario and/or the vehicle type to be tested, wherein the rule-based algorithm determines compatibility on the basis of a hardware and/or software component that executes the virtual test of the device for at least partial autonomous driving of the motor vehicle and/or provides test data.

In addition, the method comprises the output of the at least one further system parameter, which is compatible with the at least one first system parameter.

The invention also relates to a system for determining compatibility of system parameters for a test execution of a virtual test of a device for at least partial autonomous driving of a motor vehicle.

The system provides a parked selection or selecting at least one first system parameter that designates a system to be tested, a test environment, a test system, a test scenario and/or a vehicle type to be tested for the test execution of the virtual test.

Furthermore, the system applies a rule-based algorithm to the at least one first system parameter for determining compatibility of the at least one first system parameter with at least one further system parameter from a group including the system to be tested, the test environment, the test system, the test scenario and/or the vehicle type to be tested, wherein the rule-based algorithm determines compatibility on the basis of a hardware and/or software component that executes the virtual test of the device for at least partial autonomous driving of the motor vehicle and/or provides test data.

The system also outputs the at least one further system parameter, which is compatible with the at least one first system parameter.

One idea of the invention is to enable error-free configurability of the test execution because by determining the compatibility of at least one first system parameter with at least one further system parameter from a group including the system to be tested, the test environment, the test system, the test scenario and/or the vehicle type to be tested, only compatible components are used for test execution.

A rule-based algorithm or a rule-based system is a knowledge-based system in which rule-based reasoning takes place. Rule-based systems usually include a database of facts, the fact base, a set of rules, the rule base, a control system with a rule interpreter, also called an inference engine.

The rule-based algorithm according to the invention queries a database to determine the compatibility of the at least one first system parameter with at least one further system parameter, in which a compatibility definition of the at least one first system parameter with the further system parameters is stored.

In the context of the present invention, compatibility can be understood to be that the at least one first system parameter can be used with the at least one further system parameter in the context of a test execution of a virtual test of a device for at least partial autonomous guidance of a motor vehicle without the test terminating due to mismatched or incompatible hardware and/or software components.

The system to be tested can be a computer-implemented method for carrying out the virtual test of the device for at least partial autonomous guidance of the motor vehicle and the test environment is formed by software and/or hardware components of the test environment. Thus, effective testing of the system to be tested in the test environment can be carried out in an advantageous manner.

The hardware and/or software component that executes the virtual test of the device for at least partial autonomous guidance of the motor vehicle and/or provides test data can be a type of sensor, for example, a camera sensor, a radar sensor, a LiDAR sensor, an ultrasonic sensor, a rain sensor and/or a brightness sensor, a processor type, in particular a CPU or GPU, and a type of test system. The compatibility test thus advantageously ensures that the system to be tested is tested using suitable hardware and/or software components.

The system to be tested, the test environment, the test system, the test scenario and/or the vehicle type to be tested can each be defined by a plurality of categories of system components and/or system properties, wherein each category of system components and/or system properties assigned to the system to be tested, the test environment, the test system, the test scenario and/or the vehicle type to be tested has at least one designation, in particular an alphabetical and/or numerical designation, which identifies the system component and/or the system property.

The designation thus enables a uniform naming of the corresponding system components, so that different users can easily comprehend and manage the test execution.

The designation can be understood to be an annotation, a label, or a tag. The system parameters are thus annotated by the alphabetical and/or numerical designation or tag. The designation describes a type of sensor which, for example, can be used in conjunction with a system to be tested or is compatible with it. Likewise, for example, a graphics processor type, for example a specific GPU can be described, which can be used in conjunction with a system to be tested or is compatible with this.

The plurality of categories categorize the system to be tested, the test environment, the test system, the test scenario and/or the vehicle type to be tested into system components and/or system properties.

System components can be categorized, for example, by a usable type of sensor, in particular a camera sensor, a radar sensor, an LiDAR sensor, an ultrasonic sensor, a rain sensor and/or a brightness sensor and/or a usable type of processor or graphics processor. System properties can be, for example, energy consumption and/or computing or data processing power of the system components.

In order to be able to evaluate the compatibility of two system parameters, it is therefore defined in which categories the tags or descriptions of the two system parameters match or must be compatible.

Compatibility of the at least one first system parameter with the at least one, further system parameter can be provided by matching at least one first designation which identifies the system component and/or the system property with a second designation which identifies the system component and/or the system property. Compatibility can thus be achieved by corresponding dependencies of the designations of system parameters.

The system to be tested can require availability of parked computing resources and/or type of sensors. An example of computing resources can be a given graphics card.

It is can also be provided that in response to the output of the at least one, further system parameter by the rule-based algorithm, which is compatible with the at least one first system parameter, at least one second system parameter is selected from the group of further system parameters for the test execution of the virtual test. Thus, a further limitation of the system parameters of a specific test configuration can be enabled in an advantageous manner.

The rule-based algorithm can be used on the provided and/or selected at least one first system parameter and the selected at least one second system parameter for the test execution of the virtual test to determine compatibility of the at least one first system parameter and the at least a second system parameter with the further system parameters. This makes it possible to determine the compatibility of a combination of the first system parameter and the second system parameter with the other system parameters.

The rule-based algorithm can output the further system parameters, which are compatible with the at least one first system parameter and the at least one second system parameter. A user can thus execute the test based on the output result, or alternatively further restrict or select system parameters.

Further, it can be provided that in response to the output of the further system parameters by the rule-based algorithm, which is compatible with the at least one first system parameter and the at least one second system parameter, at least a third system parameter can be selected from the group of further system parameters for the test execution of the virtual test. Thus, a further limitation of the system parameters of a specific test configuration can be made possible in an advantageous manner.

The rule-based algorithm can be applied to the provided and/or selected at least one first system parameter, the selected at least one second system parameter and the selected at least one third system parameter for the test execution of the virtual test for determining compatibility of the at least one first system parameter, of the at least one second system parameter and the at least one third system parameter with further system parameters.

This makes it possible to determine compatibility of a combination of the first system parameter, the second system parameter, and the third system parameter with the other system parameters.

The rule-based algorithm can output the further system parameters, which are compatible with the at least one first system parameter, the at least a second system parameter and the at least a third system parameter. The user can thus execute the test based on the output result, or alternatively further restrict or select system parameters.

The rule-based algorithm for determining the compatibility of the at least one first system parameter with the further system parameters can query a database, in particular centrally managed on a server, in which a compatibility definition of the at least one first system parameter with the further system parameters is stored. Thus, compatibility of the respective system parameters with each other can be determined in an advantageous manner.

Also, it can be provided that on the basis of the determined compatibility of the system parameters, the test execution of the virtual test of the device for at least partial autonomous guidance of the motor vehicle may be configured using the selected system parameters. This can advantageously enable error-free test execution.

The features described herein of the computer-implemented method for determining compatibility of system parameters for a test execution of a virtual test of a device for at least partial autonomous guidance of a motor vehicle are also applicable to the system for determining the compatibility of system parameters for a test execution of a virtual test of a device for at least partial autonomous driving of a motor vehicle, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
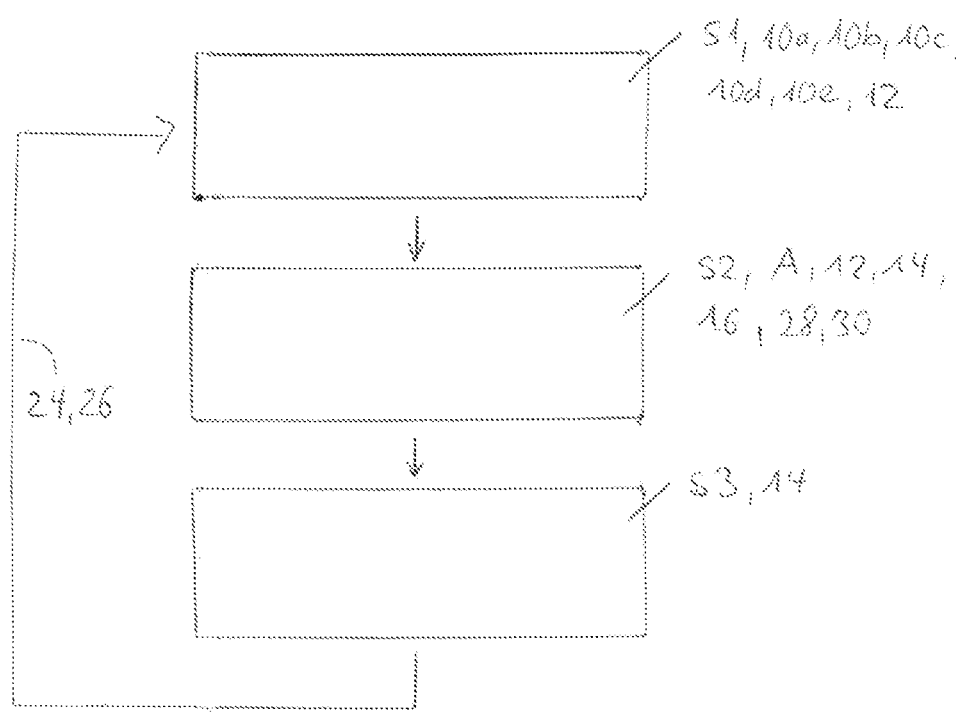
FIG. 1 is a flowchart of a computer-implemented method for determining compatibility of system parameters for a test execution of a virtual test of a device for at least partial autonomous guidance of a motor vehicle.

The method shown in FIG. 1 comprises providing S1 a parked selection or selecting of at least one first system parameter 12 that designates a system 10a to be tested, a test environment 10b, a test system 10c, a test scenario 10d and/or a vehicle type 10e to be tested for the test execution of the virtual test.

The method also comprises applying S2 a rule-based algorithm A to the at least one first system parameter 12 for determining compatibility of the at least one first system parameter 12 with at least one further system parameter 14 from a group comprising the system 10a to be tested, the test environment 10b, the test system 10c, the test scenario 10d and/or the vehicle type 10e to be tested. The rule-based algorithm A determines the compatibility on the basis of a hardware and/or software component 16 that executes the virtual test of the device 8 for at least partial autonomous guidance of the motor vehicle and/or provides test data.

In addition, the method comprises the output S3 of the at least one further system parameter 14, which is compatible with the at least one first system parameter 12.

The system 10a to be tested is a computer-implemented method for performing the virtual test of the device 8 for at least partial autonomous guidance of the motor vehicle and the test environment 10b is formed by software and/or hardware components of the test environment 10b.

The hardware and/or software component 16 that executes the virtual test of the device 8 for at least partial autonomous guidance of the motor vehicle and/or provides test data is a type of sensor, in particular a camera sensor, a radar sensor, a LiDAR sensor, an ultrasonic sensor, a rain sensor and/or a brightness sensor, a processor type, in particular a CPU or GPU, and a type of test system 10c.

In response to the output S3 of the at least one, further system parameter 14 by the rule-based algorithm A, which is compatible with the at least one first system parameter 12, at least one second system parameter 24 is further selected from the group of further system parameters 14 for the test execution of the virtual test.

The rule-based algorithm A is applied to the provided and/or selected at least one first system parameter 12 and the selected at least one second system parameter 24 for the test execution of the virtual test to determine compatibility of the at least one first system parameter 12 and the at least one second system parameter 24 with the further system parameters 14.

The rule-based algorithm A further outputs the further system parameters 14, which are compatible with the at least one first system parameter 12 and the at least one second system parameter 24.

In response to the output of the further system parameters 14 by the rule-based algorithm A, which is compatible with the at least one first system parameter 12 and the at least one second system parameter 24, at least one third system parameter 26 from the group of further system parameters 14 is further selected for the test execution of the virtual test.

The rule-based algorithm A is thereby applied to the provided and/or selected at least one first system parameter 12, the selected at least one second system parameter 24 and the selected at least one third system parameter 26 for the test execution of the virtual test to determine compatibility of the at least one first system parameter 12, of the at least one second system parameter 24, and the at least one third system parameter 26 with further system parameters 14.

The rule-based algorithm A then outputs the further system parameters 14, which are compatible with the at least one first system parameter 12, the at least one second system parameter 24 and the at least one third system parameter 26.

The rule-based algorithm A further queries a database 30, in particular centrally managed on a server 28, to determine the compatibility of the at least one first system parameter 12 with the further system parameters 14. In the database 30, a compatibility definition of at least one first system parameter 12 with the further system parameters 14 is stored.

On the basis of the determined compatibility of the system parameters 12, 14, 24, 26, the test execution of the virtual test of the device 8 for at least partial autonomous guidance of the motor vehicle is configured using the selected system parameters.

Figure 2:
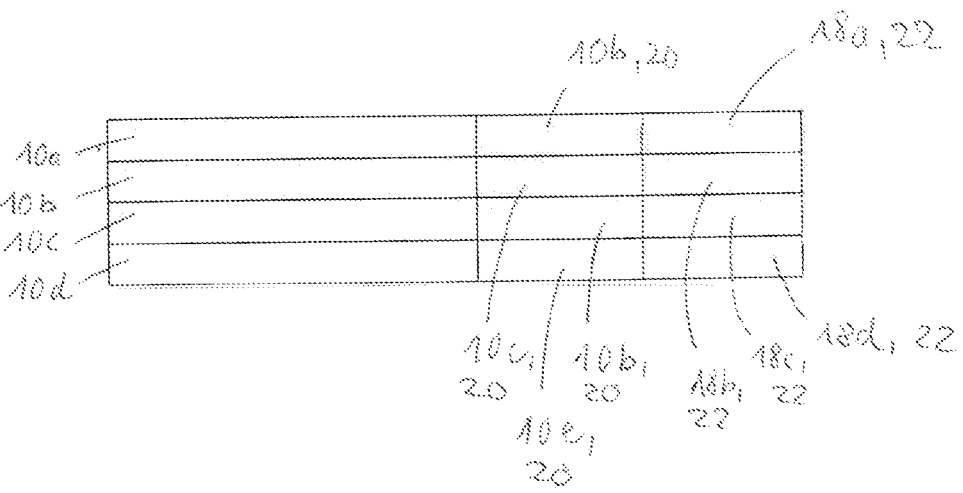
FIG. 2 is a tabular representation of a compatibility definition of system parameters for the test execution of the virtual test of the device for at least partial autonomous guidance of the motor vehicle.

FIG. 2 shows a tabular representation of a compatibility definition of system parameters for the test execution of the virtual test of the device for at least partial autonomous guidance of the motor vehicle.

The system 10a to be tested, the test environment 10b, the test system 10c, the test scenario 10d and/or the vehicle type 10e to be tested are each defined by a plurality of categories 18a, 18b, 18c, 18d of system components and/or system properties. Each category 18a, 18b, 18c, 18d of system components and/or system properties assigned to the system to be tested, the test environment 10b, the test system 10c, the test scenario 10d and/or the vehicle type 10e to be tested has at least one designation, in particular an alphabetical and/or numeric designation, which identifies the system component and/or the system property.

Compatibility of the at least one first system parameter 12 with the at least one, further system parameter 14 is provided by matching at least one first designation 20 which identifies the system component and/or the system property with a second designation 22 which identifies the system component and/or the system property. The system 10a to be tested also requires the availability of parked computing resources and/or types of sensors.

Figure 3:
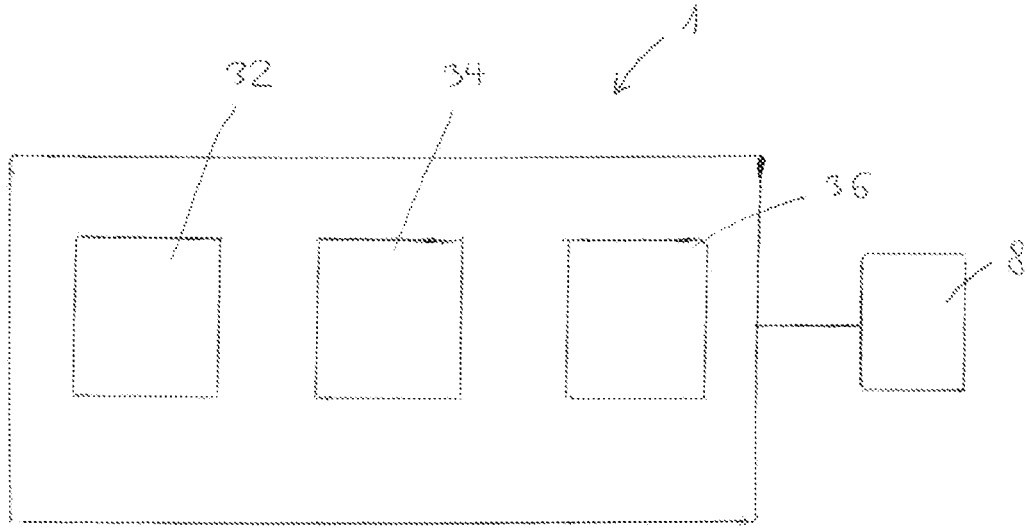
FIG. 3 is a schematic representation of a system for determining the compatibility of system parameters for the test execution of the virtual test of the device for at least partial autonomous guidance of the motor vehicle.

FIG. 3 shows a schematic representation of a system 1 for determining the compatibility of system parameters for the test execution of the virtual test of the device for at least partial autonomous guidance of the motor vehicle according to the preferred embodiment of the invention.

System 1 comprises a selector 32 for providing a parked selection or selecting at least one first system parameter 12 that designates a system 10a to be tested, a test environment 10b, a test system 10c, a test scenario 10d and/or a vehicle type 10e to be tested for the test execution of the virtual test.

The system 1 also comprises an applicator 34 for applying a rule-based algorithm A to the at least one first system parameter 12 to determine compatibility of the at least one first system parameter 12 with the at least one further system parameter 14 from a group comprising the system 10a to be tested, the test environment 10b, the test system 10c, the test scenario 10d and/or the vehicle type 10e to be tested, wherein the rule-based algorithm A determines compatibility on the basis of a hardware and/or software component 16 that executes the virtual test of the device 8 for at least partial autonomous guidance of the motor vehicle and/or provides test data.

In addition, the system 1 comprises an output 36 for the output of the at least one further system parameter 14, which is compatible with the at least one first system parameter 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method, comprising:
determining compatibility of system parameters for a test execution of a virtual test of a device for at least partial autonomous driving of a motor vehicle, said determining comprising:
providing a parked selection of, or selecting, at least one first system parameter, from a group of parameters including:
a parameter that designates a system to be tested;
a parameter that designates a test environment;
a parameter that designates a test system;
a parameter that designates a test scenario; and a parameter that designates a vehicle type to be tested for the test execution of the virtual test;
applying a rule-based algorithm to the at least one first system parameter for determining compatibility of the at least one first system parameter with a plurality of further system parameters including the system to be tested, the test environment, the test system, the test scenario and the vehicle type to be tested, the rule-based algorithm determining compatibility on the basis of a hardware and/or software component that executes the virtual test of the device for at least partially autonomous guidance of the motor vehicle and/or provides test data;
outputting the at least one further system parameter, which is compatible with the at least one first system parameter; and
configuring the test execution of the virtual test of the device for at least partial autonomous driving of the motor vehicle based on the at least one first system parameter, the at least one further system parameter and the compatibility; and
executing the virtual test based on the outputted at least one further system parameter or further select system parameters.

2. The computer-implemented method according to claim 1, wherein the system to be tested is a computer-implemented method for performing the virtual test of the device for at least partial autonomous guidance of the motor vehicle and the test environment is formed by software and/or hardware components of the test environment.

3. The computer-implemented method according to claim 2, wherein the system to be tested requires availability of parked computing resources and/or type of sensors.

4. The computer-implemented method according to claim 1, wherein the hardware and/or software component that executes the virtual test of the device for at least partial autonomous guidance of the motor vehicle and/or provides the test data is a type of sensor, a camera sensor, a radar sensor, a LIDAR sensor, an ultrasonic sensor, a rain sensor and/or a brightness sensor, and/or a processor type, and a type of test system.

5. The computer-implemented method according to claim 4, wherein the processor type is a CPU or a GPU.

6. The computer-implemented method according to claim 1, wherein the system to be tested, the test environment, the test system, the test scenario and/or the vehicle type to be tested are each defined by a plurality of categories of system components and/or system properties, wherein each category of system components and/or system properties assigned to the system to be tested, the test environment, the test system, the test scenario and/or the vehicle type to be tested has at least one designation, which identifies the system component and/or the system property.

7. The computer-implemented method according to claim 6, wherein compatibility of the at least one first system parameter with the at least one, further system parameter is given by matching at least one first designation which identifies the system component and/or the system property with a second designation which identifies the system component and/or the system property.

8. The computer-implemented method according to claim 6, wherein the at least one designation is an alphabetical and/or numeric designation.

9. The computer-implemented method according to claim 1, wherein, in response to the output of the at least one, further system parameter, at least one second system parameter is selected by the rule-based algorithm which is compatible with the at least one first system parameter from the group of further system parameters for the test execution of the virtual test.

10. The computer-implemented method according to claim 9, wherein the rule-based algorithm is applied to the provided and/or selected at least one first system parameter and to the selected at least one second system parameter for the test execution of the virtual test to determine compatibility of the at least one first system parameter and the at least one second system parameter with the further system parameters.

11. The computer-implemented method according to claim 10, wherein the rule-based algorithm outputs the further system parameters which are compatible with the at least one first system parameter and the at least one second system parameter.

12. The computer-implemented method according to claim 11, wherein in response to the output of the further system parameters by the rule-based algorithm, which is compatible with the at least one first system parameter and the at least one second system parameter, at least a third system parameter is selected from the group of further system parameters for the test execution of the virtual test.

13. The computer-implemented method according to claim 12, wherein the rule-based algorithm is applied to the provided and/or selected at least one first system parameter, the selected at least one second system parameter and the selected at least one third system parameter for the test execution of the virtual test to determine compatibility of the at least one first system parameter, the at least one second system parameter and the at least one third system parameter with further system parameters.

14. The computer-implemented method according to claim 13, wherein the rule-based algorithm outputs the further system parameters which are compatible with the at least one first system parameter, the at least one second system parameter and the at least one third system parameter.

15. The computer-implemented method according to claim 12, further comprising determining a compatibility of the first system parameter, the second system parameter, and the third system parameter with the further system parameters.

16. The computer-implemented method according to claim 1, wherein the rule-based algorithm for determining compatibility of the at least one first system parameter with the further system parameters queries a database, in which a compatibility definition of at least one first system parameter with the further system parameters is stored.

17. The computer-implemented method according to claim 16, wherein the database is centrally managed on a server.

18. The computer-implemented method according to claim 1, wherein the system to be tested, the test environment, the test system, the test scenario and the vehicle type to be tested are each defined by a plurality of categories of system components and system properties, and wherein each of the plurality of categories of system components and system properties has an alphabetical and a numeric designation, which identifies the system component and the system property.

19. The computer-implemented method according to claim 1, wherein the test environment describes the environment in which the system to be tested is tested and the test system describes the system on which the test is performed.

* * * * *